US010720184B2

(12) United States Patent
Anderson

(10) Patent No.: US 10,720,184 B2
(45) Date of Patent: Jul. 21, 2020

(54) SELECTIVE RECORDING OF AUGMENTED REALITY OBJECTS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 15/072,189

(22) Filed: Mar. 16, 2016

(65) Prior Publication Data

US 2017/0270971 A1   Sep. 21, 2017

(51) Int. Cl.
| | |
|---|---|
| *H04N 5/93* | (2006.01) |
| *G11B 27/036* | (2006.01) |
| *G06T 19/00* | (2011.01) |
| *H04N 21/472* | (2011.01) |
| *H04N 21/422* | (2011.01) |
| *A63F 13/53* | (2014.01) |
| *A63F 13/215* | (2014.01) |

(52) U.S. Cl.
CPC .......... *G11B 27/036* (2013.01); *A63F 13/215* (2014.09); *A63F 13/53* (2014.09); *G06T 19/006* (2013.01); *H04N 21/42203* (2013.01); *H04N 21/47205* (2013.01); *A63F 2300/8082* (2013.01); *G06T 2215/16* (2013.01)

(58) Field of Classification Search
CPC .... G11B 27/0036; A63F 13/215; A63F 13/53; A63F 2300/8082; H04N 21/42203; H04N 21/47205; G06T 19/006; G06T 2215/16

USPC ......................................................... 386/282
See application file for complete search history.

(56) References Cited

U.S. PATENT DOCUMENTS

| | | | | |
|---|---|---|---|---|
| 7,949,295 | B2 * | 5/2011 | Kumar | F41A 33/00 345/418 |
| 8,436,891 | B2 * | 5/2013 | Gefen | H04N 5/4403 348/43 |
| 9,676,215 | B2 * | 6/2017 | Yoshinaga | B41J 29/17 |
| 9,679,215 | B2 * | 6/2017 | Holz | G06K 9/00201 |
| 10,380,650 | B2 * | 8/2019 | Hamedi | G06Q 30/0277 |
| 2015/0108215 | A1 * | 4/2015 | Ehrlich | G01S 17/88 235/404 |
| 2015/0332515 | A1 * | 11/2015 | Elmekies | H04W 4/026 345/419 |
| 2016/0091964 | A1 * | 3/2016 | Iyer | G02B 27/017 345/633 |

(Continued)

*Primary Examiner* — Helen Shibru
(74) *Attorney, Agent, or Firm* — Schwabe, Williamson & Wyatt, P.C.

(57) ABSTRACT

Participants can compete in a physical environment, such as by piloting a car around a track. The competition is recorded in a video. Participants can interact physically with each other and with the race environment, such as by steering into one another and navigating the race environment. Participants can also interact virtually, such as "shooting" one another with digitally rendered weapons. Both real and virtual interactions affect the outcome of the competition. The video is programmatically altered to show special effects and is programmatically edited to select physical and virtual interactions, changes, which had the largest effect on the outcome of the competition. The programmatically altered video may be played back during game play and the programmatically edited video may be played back after the competition.

18 Claims, 10 Drawing Sheets

(56) References Cited

U.S. PATENT DOCUMENTS

2017/0178406 A1\* 6/2017 Anderson .................. G06F 3/01
2018/0359414 A1\* 12/2018 Wang ................... H04N 13/243

\* cited by examiner

SELECTIVE RECORDING OF AUGMENTED REALITY OBJECTS

TECHNICAL FIELD

The present disclosure relates to the field of computing. More particularly, the present disclosure relates to augmented reality objects and selectively recording augmented reality objects.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Productions of broadcast events like the Olympics and professional sports often include visual augmentation of replay footage to show key moments during races and competitions. For example, overlaid on a video of a ski run, an expert might draw an idealized path of a skier around a corner or may overlay the path of the fastest skier around the corner; the idealized or fastest version may be overlaid on video of other skiers, and the overlaid video may be broadcast to show the relative progress of the skiers through the course. With the right camera angle and distance, golf swing applications can identify major body parts and equipment, and can automatically add visual effects to show issues with posture and swing.

Millions of race-oriented toys are sold each year. In some electric race tracks, one person's car can crash into a wall and slow down, losing the race. In others, racers may drive radio-controlled cars around an open track and "shoot" one another with virtual "bombs" or "guns"; an opponent who is "hit" may slow enough to lose the race. In other competitions, such as those described in application Ser. No. 14/747,637, filed Jun. 23, 2015, titled, "Game Surface Adjustment", the surface or other components of the track may be modified by digital activity, which modifications may cause an opponent to slow down.

For toys, it would be fun to record highlights of a competition, to show how or why someone won, without having to watch an entire video of the competition. However, the system described above in the case of skiers involves expensive human judgment and input, which just is not practical when thousands of people (or even more) may be using the system at the same time.

For augmented reality contests—contests involving real equipment which is augmented by computer-enabled digital objects—programmatically selecting video "highlights" is challenging because players engage in both real and virtual interactions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 includes illustration of an Augmented Reality Competition having two examples of Augmented Reality Objects, physical tracks, and digital and physical changes which may occur as an Augmented Reality Competition unfolds.

FIG. 2 includes illustration of two Augmented Reality Objects and Digital Object Outputs which may be implemented as an Augmented Reality Competition unfolds.

FIG. 3 includes illustration of Augmented Reality Objects which experience a difference in speed during an Augmented Reality Competition as well as Sensor Data records in an Augmented Reality Server Datastore.

DETAILED DESCRIPTION

Figure 1:
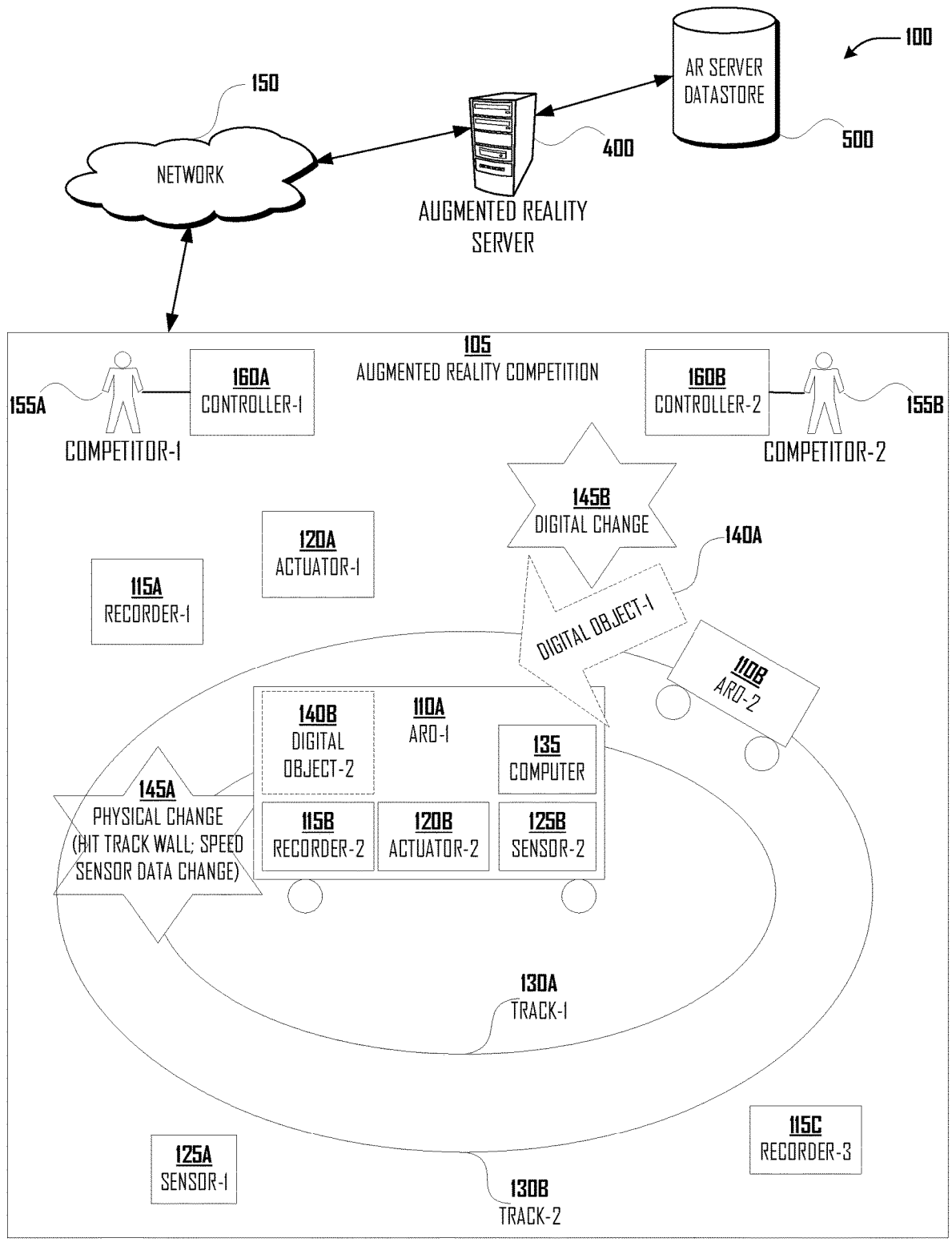
FIG. 1 is a diagram illustrating examples of network(s), computing devices, and physical and logical relationship of these components, according to various embodiments.

In the following detailed description, reference is made to the accompanying drawings which form a part hereof. In the drawings, like numerals designate like parts and elements throughout, illustrating embodiments that may be practiced. An effort is made in this document to use a corresponding figure number as the first digit in element numbers. For example, Notable Change 545 is illustrated in FIG. 5. In certain instances, an element number may appear in another Figure. For example, Augmented Reality Competition Module 600 appears in FIG. 4 as a module record(s) within Augmented Reality Server Memory 450, while Augmented Reality Competition Module 600 is more completely illustrated in FIG. 6.

It is to be understood that other embodiments may be utilized and structural or logical changes may be made without departing from the scope or spirit of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Use of a reference number without a letter suffix is a reference to a type of component, encompassing all components illustrated with the common reference number.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

In overview, disclosed are methods and apparatuses to identify and selectively record portions of an augmented reality competition which are likely to be interesting. Participants in the augmented reality competition compete in an environment; the environment includes physical components, such as a track, and digital objects which augment the real physical components. Participants can interact with the physical environment, such as by running into a wall or spinning out around a corner. Some of the digital objects may be unrelated to the competition, such as virtual lighting, music, color choices, advertising, and the like. Some of the digital objects may relate to the competition, such virtual dirt or grease rendered to appear on a car or a competitor; digital objects may further a competitor toward an objective of the competition, such as a bomb, bullet, arrow, or the like "shot" by one competitor at another which may augment reality by slowing (or speeding) the engine of a competitor, activating a brake or a barrier, changing a physical structure in the track, and the like.

The competition is recorded or encoded in one or more videos. Both real and virtual interactions and changes affect the outcome of the competition. The video(s) is(are) programmatically altered to show special effects of digital objects and is(are) programmatically edited to select "highlights" comprising physical and digital changes which had an effect on the outcome of the competition. The selected changes may be those with an effect relative to an objective of the competition, such as speeding up or slowing down by a threshold amount and/or relative to a competitor, and/or the selected changes may be have been designated for being recorded, either by the competitors or by the creators of the game. The programmatically altered video may be played back during game play and the "highlights" may be played back after the competition.

Referring to FIG. 1, illustrated is Augmented Reality Competition 105. Augmented Reality Competition 105 comprises a physical environment augmented with digital objects. The physical environment augmented with digital objects illustrated by way of example in FIG. 1 may comprise physical Track-1 130A and Track-2 130B, Augmented Reality Objects ("ARO"; such as Augmented Reality Object-1 110A and Augmented Reality Object-2 110B) having physical objects augmented with digital objects, physical Recorders (Recorder-1 115A Recorder-2 115B, Recorder-3 115C), physical Sensors (Sensor-1 125A and Sensor-2 125B), physical Actuators (such as Actuator-1 120A). These components are described further below. These elements may be incorporated with teachings of the present disclosure to cooperate with each other and other elements to enable selective recording of Augmented Reality Competition 105, e.g., in response to detection of "notable" change events as Augmented Reality Competition 105 unfolds. For ease of understanding, physical objects such as physical Recorders, physical Sensors et al will simply be referred to as Recorders, Sensors, and so forth.

Example Augmented Reality Competition 105 may also comprise Digital Objects (such as Digital Object-1 140A and Digital Object-2 140B) to augment the physical objects in the physical environment. Digital Objects implement digitally computer generated aspects of Augmented Reality Competition 105. Digital Objects implementing digitally generated aspects of Augmented Reality Competition 105 may exist entirely in a digital environment, such as in digitally generated videos, images, sounds and the like, though Digital Objects implementing digitally generated aspects of Augmented Reality Competition 105 may also augment Augmented Reality Objects in the physical environment, such as via Actuators (discussed further below). Digital Objects may be implemented by Augmented Reality Server 400 and/or the computers, Sensors, and Actuators within Augmented Reality Competition 105 and Augmented Reality Objects. As discussed further herein, Digital Objects may comprise Digital Object Triggers (which trigger a Digital Object) and Digital Object Output (the output which may be produced by a triggered Digital Object).

Also illustrated as an example in FIG. 1, Augmented Reality Objects may undergo Notable Changes, such as Physical Change 145A and/or Digital Change 145B (which, in embodiments, may cause recording of Augmented Reality Competition 105).

Also illustrated as an example in FIG. 1, Augmented Reality Competition 105 may comprise Competitor-1 155A and Competitor-2 155B, also referred to herein as "participant" or "participant in the augmented reality competition". In alternate embodiments, an Augmented Reality Competition 105 may comprise only one Competitor or more than two. Each competitor may be associated with a Controller, such as Controller-1 160A and Controller-2 160B. Controller 160 may be understood as a form of Sensor, though it may also be a form of Actuator (in the case of a Controller 160 which provide haptic feedback). Controller 160 may be used by Competitor to provide input to Augmented Reality Server 400, to control Augmented Reality Objects 110 within Augmented Reality Competition 105.

In the example illustrated in FIG. 1, Tracks 130 may be "slot" tracks which supply power to a car, vehicle, character robot, or the like, in which case the Tracks should be understood as comprising a form of Actuator/Sensor; alternatively, the Tracks may be a physical area where physical components operate, without instrumentation of an Actuator/Sensor. Tracks are illustrated as physical objects of one example physical environment of Augmented Reality Competition 105. Physical environments may have physical objects other than tracks, such as a board, field, body of water, area of air, or the like.

Augmented Reality Objects, illustrated at as, for example, ARO 110 in FIG. 1, may comprise a physical component, such as a car, vehicle, drone, robot, building, sign, or the like, and one or more Digital Object 140, which Digital Object 140 describe and implement augmentations to the real, physical component(s). The augmentations may be implemented through a digital rendering, such as in an audio or video modification made by Effect Module 800 to a video, and/or augmentations may be implemented physically, such as by Actuator 120.

As illustrated in FIG. 1, Actuator-2 120B may be within ARO-1 110A and may be used to control ARO-1 110A in digital and physical environments. In the case of the physical environment, Actuator may comprise, for example, at least one of a speaker, a projector, a motor (including servos, rotary motors, linear motors, piezoelectric sensors/actuators), a switch, a source of compressed water, air, or other gas or fluid and control valves, a projectile ejecting device (such as a gun, whether spring loaded, compressed air, or otherwise) and controller(s) thereof. In a digital environment, Actuator may comprise a registration with a digital object rendering module, such as Augmented Reality Competition Module 600, and/or with an operating system or the like. Such registration may allow Actuator to control implementation of Digital Object-2 140B in the digital environment.

ARO 110 may further comprise a Sensor, such as Sensor-2 125B in ARO-1 110A, and a Recorder, such as Recorder-2 115B. Recorder may be, for example, an audio/video camera, microphone, recorder, or the like.

Sensor 125 may be a sensor of objects in the physical environment and/or Sensor 125 may comprise a registration by a sensor module, such as Sensor Module 700, with a digital object rendering module, an augmented reality competition module, such as Augmented Reality Competition Module 600, and/or with an operating system or the like to receive information regarding Digital Objects, such as regarding Digital Object-2 140B.

When sensing objects in the physical environment, Sensor 125 may comprise, for example, a microphone, a camera, a pressure sensor, a motion and/or rate of motion detector, a capacitive surface, a conduction detector, a detector of electromagnetic energy (such as RF, infrared, visible light, etc.), a vibration detector, a proximity detector, a fiducial marker detector, and the like. Sensor-1 125A may be, for example, a proximity sensor, an external speed sensor, a microphone, or the like. Sensor-2 125B may be, for example, a sensor in a motor (such as a Hall sensor), or on a drive-shaft or wheel, or it may be a proximity sensor, a touch sensor, or the like.

ARO 110 may further comprise Recorder 115, such as Recorder-2 115B in ARO-1 110A. Recorder 115 may be, for example, an audio/video recorder. Digital recordings, such as Recording 565, may be made or encoded by Recorder 115.

ARO 110 may further comprise one or more computers, such as Computer 135 in ARO-1 110A. Computer 135 may be used to control Recorder 115, Actuator 120, Sensor 125, to communicate with Augmented Reality Server 400 to implement Digital Object 140, and the like. Computer 135 may be a special purpose, dedicated computer or may be a general purpose computer similar to the computer illustrated in FIG. 4, which describes Augmented Reality Server 400.

Also illustrated in FIG. 1 is Augmented Reality Server 400. Augmented Reality Server 400 is illustrated further in FIG. 4 as comprising User Interface Module 460, Augmented Reality Competition Module 600 (illustrated further in FIG. 6), Sensor Module 700 (illustrated further in FIG. 7), Effect Module 800 (illustrated further in FIG. 8), and Recording Modification Module 900 (illustrated further in FIG. 9). Also illustrated in FIG. 1 are Augmented Reality Server Datastore 500 (illustrated further in FIG. 5).

ARO(s) 110, Sensor(s) 125, Actuator(s) 120, and Augmented Reality Server(s) 400 may be paired, such as in the context of an Augmented Reality Competition.

These modules and components may communicate via Network 150 with Augmented Reality Server 400 (and Augmented Reality Server Datastore 500) and with one another.

Network 150 may comprise computers, network connections among the computers, and software routines to enable communication between the computers over network connections. Network 150 may be used to enable relatively long-range communication or short-range communication (such as, for example, between components within Augmented Reality Competition 105 in a local area network). Examples comprise an Ethernet network, the Internet, and/or a wireless network, such as a Wi-Fi, GSM, TDMA, CDMA, EDGE, HSPA, LTE or other network provided with or without a wireless service provider. Connection to the Network 150 may be via a wired or a wireless connection, such as a Wi-Fi connection (Network 150 may comprise more than one network component). More than one network may be involved in a communication session between the illustrated devices. Connection to the Network 150 may require that the computers execute software routines which enable, for example, the seven layers of the OSI model of computer networking or equivalent in a wireless phone network.

This paper may discuss a first computer as connecting to a second computer (such as ARO-1 110A connecting to Augmented Reality Server 400) or to a corresponding datastore (such as to Augmented Reality Server Datastore 500); it should be understood that such connections may be to, through, or via the other of the two components (for example, a statement that a computing device connects with or sends data to Augmented Reality Server 400 should be understood as saying that the computing device may connect with or send data to Augmented Reality Server Datastore 500). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization Also illustrated in FIG. 1 are Physical Change 145A and Digital Change 145B. Physical change 145A may occur, for example, when ARO-1 110A hits a track wall and loses speed. As discussed further below, if the loss in speed exceeds a threshold, it may be classified as a Digital Object 140 by, for example, Sensor Module 700. Digital Change 145B, for example, may occur when the driver of ARO-2 110B shoots Digital Object-1 140A at ARO-1 110A. These may be classified as Notable Changes, and stored in Notable Change 545 records of Augmented Reality Datastore 500.

For example, Augmented Reality Competition Module 600 may have paired Controller-2 160B with ARO-2 110B. Augmented Reality Competition Module 600 may identify a button on a Controller-2 160B as a Digital Object Trigger 520 for Digital Object-1 140A, which Digital Object may be a "bullet" "shot" by Competitor-2 155B at ARO-1 110A. If Digital Object-1 140A "hits" ARO-2 110B (such as according to the geometry and relative position of the ARO), Digital Object Output 525 may cause Effect Module 800 to generate outputs, which outputs may be to a digital environment, such as in a video via Recording Modification Module 900, and/or may be output to the physical environment of Augmented Reality Competition 105, such as to Actuator 120. For example, in the case of output to a digital environment, a Digital Object Output of Digital Object-1 140A may be virtual bullet holes rendered on a video of ARO-1 110A. For example, in the case of output to a physical environment, Digital Object Output of Digital Object-1 140A may cause an electric engine in ARO-1 110A to slow for a period of time (which electric engine may be Actuator-2 120B). A Digital Object Output may e.g., be stored in Digital Object Output 525 record in Augmented Reality Datastore 500.

As discussed further herein, Effect Module 800 and Recording Modification Module 900 may identify Notable Change 545 record instances, such as Digital Change 145B and Physical Change 145A (or multiples of such Changes 145), may identify that one is more significant than the other, and may selectively make and/or modify a Recording of Augmented Reality Competition 105 to include modifications based on an associated Digital Object 140, if any (such as the virtual bullet holes), and/or may selectively edit Recording of Augmented Reality Competition 105, such that the Recording only shows the more significant effect. Recording may e.g., be stored in Recording 565 record in Augmented Reality Datastore 500. Examples of modified Recording 565 are discussed in relation to FIGS. 2 and 3.

Figure 2:
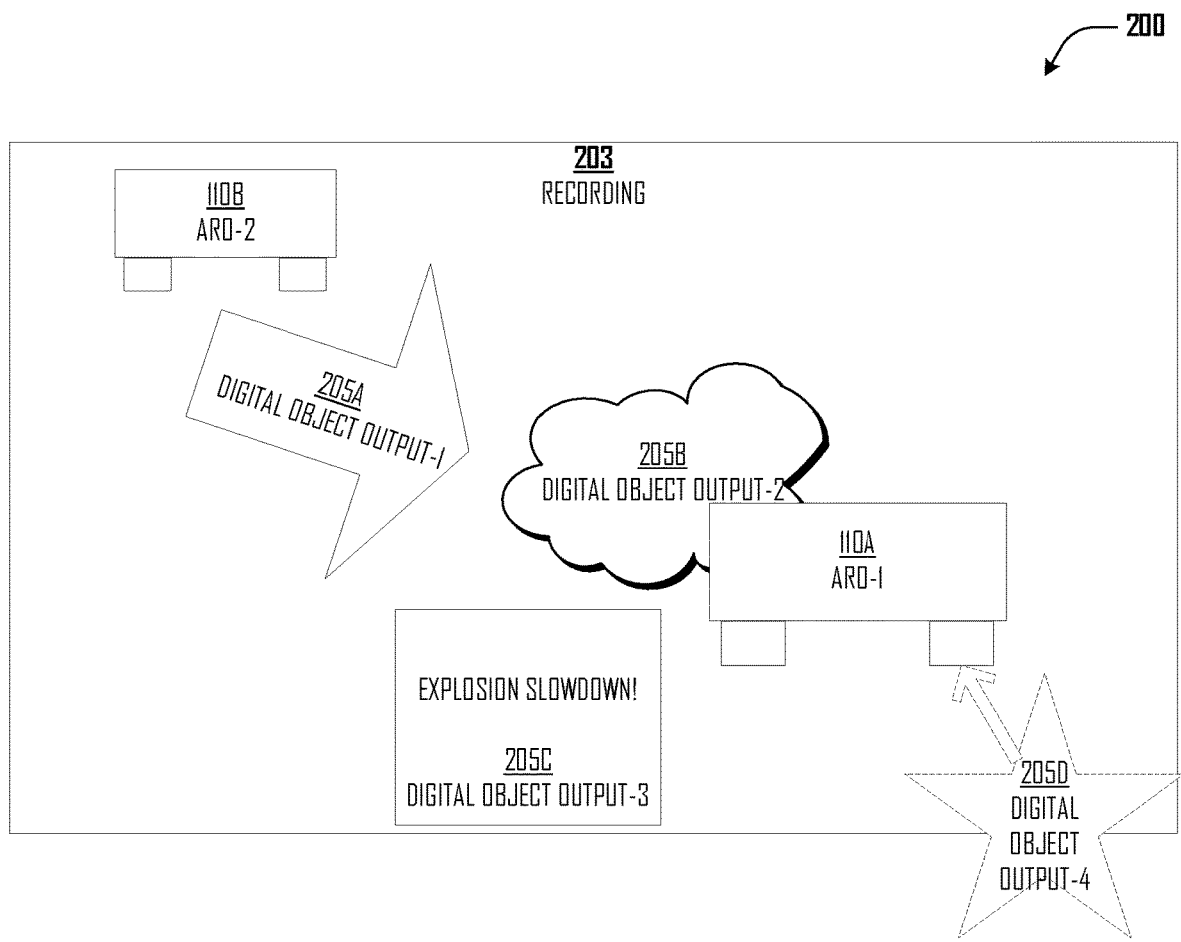
FIG. 2 is a diagram illustrating an example portion of a video recording of Augmented Reality Objects selectively made in response to notable changes, according to various embodiments.

FIG. 2 is a diagram illustrating an example portion of a video recording 203 of Augmented Reality Objects 110 selectively made in response to notable changes, according to various embodiments; FIG. 2 includes illustration of two Augmented Reality Objects, ARO-2 110B and ARO-1 110A (also illustrated in FIG. 1), and Digital Object Output 205 which may be implemented as Augmented Reality Competition unfolds.

As discussed in relation to FIG. 1, Augmented Reality Competition Module 600 and Sensor Module 700 may identify a trigger on a control associated with ARO-2 110B as a Digital Object Trigger 520 for Digital Object-1 140A, which Digital Object may e.g., be a "bullet" "shot" by an operator of ARO-2 110B at ARO-1 110A. Sensor Module 700 may determine, such as according to the geometry and relative position of ARO-2 110B and ARO-1 110A (which may be obtained from data from Sensors 125, which data may be stored as Sensor Data 530), that the digital "bullet" "hits" ARO-2 110B obliquely (a notable change event).

In response to the detection of the notable change event, Digital Object Output 525 associated with Digital Object-1 140A may cause Effect Module 800 to generate outputs, which outputs may be output to a digital environment, such as in a video via Recording Modification Module 900, and/or may be output to the physical environment of Augmented Reality Competition 105. A Digital Object Output 525 of Digital Object-1 140A may be, for example, a graphical depiction of a "bullet", Digital Object Output-1 205A, a graphical depiction of smoke, Digital Object Output-2 205B, and a graphic overlaid on the recorded video with an announcement, such as Digital Object Output-3 205C. Digital Object Output 525 of Digital Object-1 140A may also cause an electric engine in ARO-1 110A to slow for a period of time (which electric engine may be Actuator-2 120B), illustrated at Digital Object Ouput-4 205D.

As discussed further herein, certain of these changes may be identified as being Notable Changes 545, some of which may be associated with a Record Instruction 555 through execution of Augmented Reality Competition Module 600. For example, shooting the "bullet" may be judged to be a Notable Change 545 for either the shooter or the target, but may not be judged to have or be associated with a Record Instruction 555; the oblique "hit" on the other car and the slowdown in speed may be judged to be a Notable Change 545, but may not be judged to warrant a Record Instruction 555. However, the "bullet holes" and "smoke" may be judged to warrant a Record Instruction 555 and a corresponding portion of the video may be output as a highlight.

Figure 3:
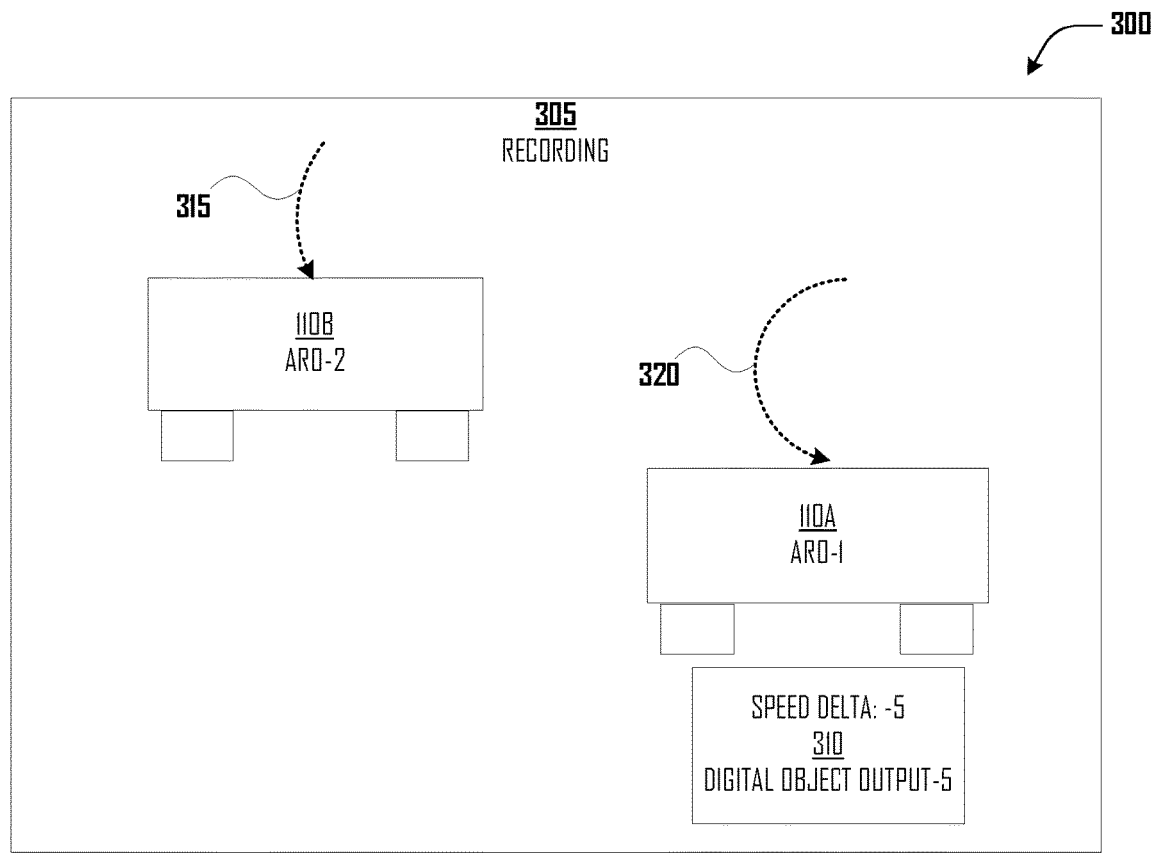
FIG. 3 is a diagram illustrating an example portion of a video recording of Augmented Reality Objects selectively made in response to notable changes, according to various embodiments.
Figure 3:
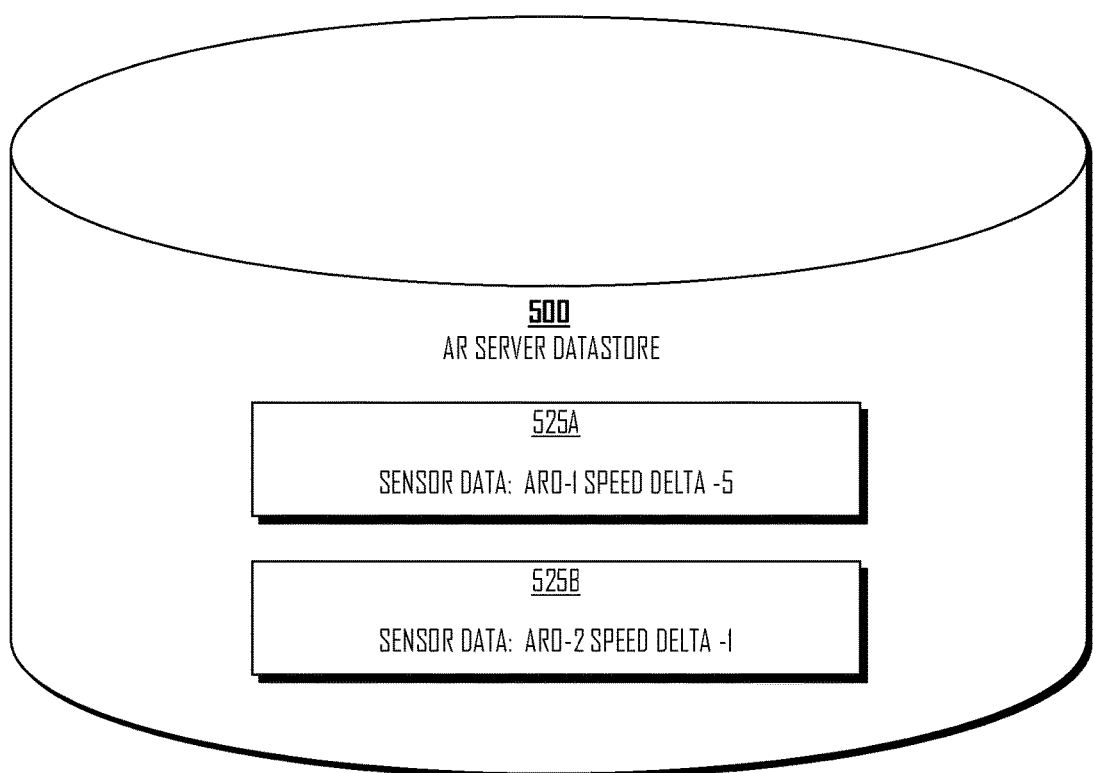

FIG. 3 is a device diagram illustrating examples of a portion of a video recording 305 of Augmented Reality Objects 110 in a competition, according to various embodiments; FIG. 3 includes illustration of Augmented Reality Objects 110A and 110B which experience a difference in speed during an Augmented Reality Competition 105 as well as Sensor Data 525 records in Augmented Reality Server Datastore 500. FIG. 3 may be understood as corresponding to Physical Change 145A in FIG. 1.

In FIG. 3, ARO-2 110B is stylistically illustrated at arrow 315 as reducing speed. ARO-1 110A is stylistically illustrated at arrow 320 as reducing speed by a larger amount. The speed may be output in Digital Object Output 310, "Speed Delta: −5", which Digital Object Output 310 may draw on Sensor Data 525A record.

These reductions in speed may be caused by the drivers of the AROs 110 slowing as they round a corner. The change in speed and the values in Sensor Data 525A and 525B may be sensed by sensors within the AROs 110, such as Sensor-2 125B, or may be sensed by external sensors, such as Sensor-1 125A. ARO-1 110A may hit the track wall and may slow more than ARO-2 110B. Augmented Reality Competition 105 may not have sensors in the track wall or in ARO-1 110A to detect the contact with the track wall. However, the change in speeds and/or the difference in the change in speeds may be noted by Sensor Module 700 as a Digital Object (and store in Digital Object 515 of Augmented Reality Datastore 500) with respect to one or both of the AROs (which may be represented in FIG. 1 by Digital Object-2 140B). Sensor Module 700 may further determine that Digital Object-2 140B is a Notable Change with respect to ARO-1 110A. Effect Module 800 may determine a Digital Object Output associated with Digital Object-2 140B, such as Digital Object Output-5 310. In FIG. 3, Digital Object Output-5 310 is illustrated as a graphical notice regarding the speed change, overlaid on the portion of the selectively recorded video of the Augmented Reality Competition, Recording 305.

Effect Module 800 may further determine whether the Notable Change is one associated with a Record Instruction (which may be stored in Record Instruction 555 record of Augmented Reality Datastore 500). The difference between the speeds of ARO-1 110A and ARO-2 110B and Digital Object-2 140B may be recognized by Effect Module 800 as warranting a Record Instruction which may result in inclusion of a corresponding portion of a Recording of the Competition in a "highlights" video of the Competition (discussed further below).

Figure 4:
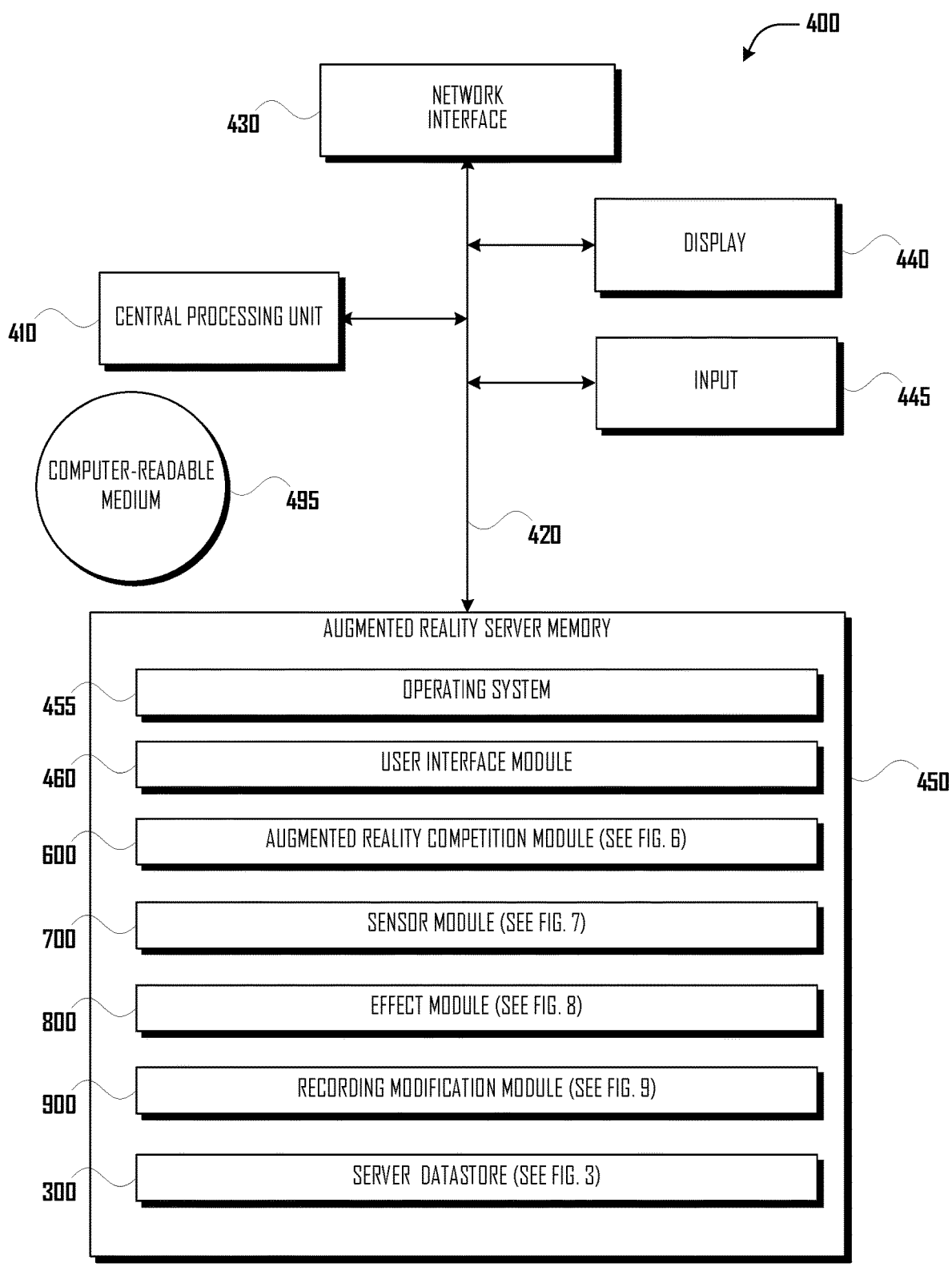
FIG. 4 is a functional block diagram illustrating an example of Augmented Reality Server.
Figure 5:
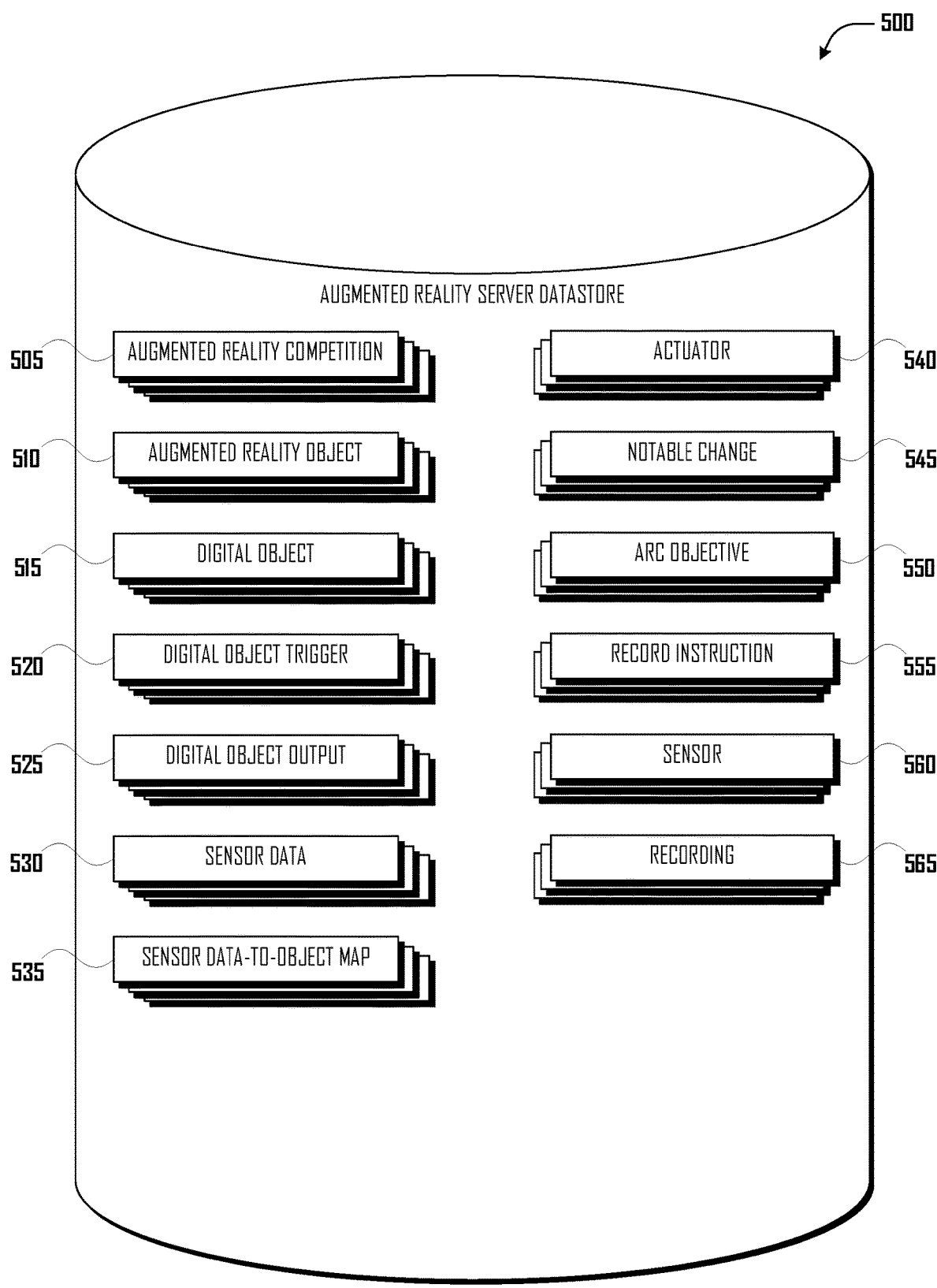
FIG. 5 is a block diagram illustrating an example of Augmented Reality Server Datastore.

FIG. 4 is a functional block diagram of an exemplary Augmented Reality Server 400 computing device and some data structures and/or components thereof. Augmented Reality Server 400 in FIG. 4 may comprise at least one Processing Unit 410, Augmented Reality Server Memory 450, Display 440 and Input 445, which all may be interconnected along with Network Interface 430 via Bus 420. Processing Unit 410 may comprise one or more general-purpose Central Processing Units ("CPU") as well as one or more special-purpose Graphics Processing Units ("GPU"). The components of Processing Unit 410 may be utilized by Operating System 455 for different functions required by the routines executed by Augmented Reality Server 400. Network Interface 430 may be utilized to form connections with Network 150 or to form device-to-device connections with other computers. Augmented Reality Server Memory 450 may generally comprise a random access memory ("RAM"), a read only memory ("ROM"), and a permanent mass storage device, such as a disk drive, SDRAM (synchronous dynamic random-access memory), or SSD (solid state drive).

Augmented Reality Server Memory 450 may store program code for software routines or modules, such as, for example, Augmented Reality Competition Module 600, Sensor Module 700, Effect Module 800, and Recording Modification Module 900 (discussed further below with references to FIGS. 6-9), as well as, for example, browser, email client and server routines, client applications, and database applications. Additional data groups for routines or modules, such as for a webserver and web browser, may also be present on and executed by the Augmented Reality Server 400. Webserver and browser routines may provide an interface for interacting with the other computing devices illustrated in FIGS. 1-3 or with other computing devices not illustrated in FIGS. 1-3, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, Augmented Reality Server Memory 450 may also store Operating System 455 and User Interface Module 460. Operating System 455 may be any one of a number of operating systems known in the art for controlling execution of software components, including allocation and usage resources of server 400. User Interface Module 460 may be used to facilitate user input. These software components (455, 460, and 600-900) may be loaded from a non-transient Computer Readable Storage Medium 495 into Augmented Reality Server Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components (455, 460, and 600-900) may also or instead be loaded via a mechanism other than a drive mechanism and Computer Readable Storage Medium 495 (e.g., via Network Interface 430).

Augmented Reality Server 400 may also comprise hardware supporting input modalities, Input 445, such as, for example, a touchscreen, a camera, a keyboard, a mouse, a trackball, a stylus, motion detectors, and a microphone. Input 445 may also serve as Display 440, as in the case of a touchscreen display which also serves as Input 445, and which may respond to input in the form of contact by a finger or stylus with the surface of Input 445. Display 440 represents any technology capable of rendering graphics, audio, smells, vibrations, and the like. Additional Input and Display components may be accessed via Network Interface 430 (such as, for example, Augmented Reality Objects, which may provide input, and a user's display device).

Augmented Reality Server 400 may also comprise or communicate via Bus 420 with Augmented Reality Server Datastore 500, illustrated further in FIG. 5. In various embodiments, Bus 420 may comprise a storage area network ("SAN"), a high speed serial bus, and/or via other suitable communication technology. In some embodiments, Augmented Reality Server 400 may communicate with Augmented Reality Server Datastore 500 via Network Interface 430. Augmented Reality Server 400 may, in some embodiments, include many more components than those shown in this Figure. However, it is not necessary that all of these generally conventional components be shown in order to disclose an illustrative embodiment.

FIG. 5 is a functional block diagram of Augmented Reality Server Datastore 500 illustrated in the computing device of FIG. 4. The components 505-599 of Augmented Reality Server Datastore 500 may include data groups used by routines. The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The components 505-599 of Augmented Reality Server Datastore 500 are discussed further herein in the discussion of the remaining Figures. An overview of these records is provided as follows:

In overview, Augmented Reality Competition 505 record(s) comprise code for or defining an Augmented Reality Competition.

Augmented Reality Object (or "ARO") 510 record(s) define Augmented Reality Objects and may include identifiers of ARO (as may be found in or associated with a real, physical ARO) and Digital Object 515 records which may be associated with an ARO.

Digital Object 515 record(s) may comprise or be associated with Digital Object Trigger 520 records, which may describe input which triggers the corresponding Digital Object. Digital Object 515 records may further comprise or be associated with Digital Object Output 525 records, which may describe output of a triggered Digital Object 515. Such output may be to an Actuator, which may be recorded as an Actuator 540 record. Output to an Actuator may result in a physical change, such as a change in speed of a car (for example, when the Actuator is a motor), or a digital changes, such as a digitally rendered effect in a digital environment (when the Actuator comprises a registration with a digital object rendering module, such as Augmented Reality Competition Module 600, and/or with an operating system or the like).

Sensor Data 530 records comprise information received from Sensors, such as Sensor-1 125A and Sensor-2 125B, which sensor information may be from dedicated physical sensors or which sensor information may be from Digital Object Output 525 records. Sensor input may be received by registration of Sensor Module 700 with a module executing an Augmented Reality Competition, with an operating system, or the like, which module may provide information regarding Sensors. Sensor input may be received in relation to specific Augmented Reality Objects or may be received in relation to the Augmented Reality Competition, generally.

Sensor Data-to-Object Map 535 record(s) may map Sensor Data 530 record(s) to Digital Object 515 record(s), as may be the case when, for example, Sensor Data 530 record(s) for a change in speed of an ARO are mapped to a Digital Object 515 record by, for example, Sensor Module 700.

Actuator 540 record(s) describe Actuators used in an Augmented Reality Competition. In the case of the physical environment, Actuators may comprise, for example, at least one of a speaker, a projector, a motor (including servos, rotary motors, linear motors, piezoelectric sensors/actuators), a switch, a source of compressed water, air, or other gas or fluid and control valves, a projectile ejecting device (such as a gun, whether spring loaded, compressed air, or otherwise) and controller(s) thereof. In a digital environment, Actuators may comprise a registration of an Augmented Reality Competition instance with a digital object rendering module, such as Augmented Reality Competition Module 600, and/or with an operating system or the like, to allow Actuator to control implementation of a Digital Object 515 in the digital environment.

Notable Change 545 record(s) are associated with Digital Object 515 record(s) (or with Digital Object Output 525 records), some of which may be associated with a Record Instruction 555 record through execution of Augmented Reality Competition Module 600.

ARC Objective 550 record(s) may be used to define objective(s) of an Augmented Reality Competition and may be used, for example by Effect Module 800, to evaluate the circumstances under which a Digital Object 515 record which is associated with a Notable Change 545 record is also furthering or hindering one or more ARO relative to an ARC Objective 550 record.

Record Instruction 555 record(s) may be used, for example, by Effect Module 800, to identify Notable Change instances which warrant recording of and/or inclusion in a "highlights" video.

Sensor 560 record(s) may be used to identify Sensors, such as Sensor 125, in an Augmented Reality Competition.

Recording 565 record(s) may be used to record encoded video, audio, Sensor Data 530 and the like produced or created in relation to an Augmented Reality Competition.

Figure 6:
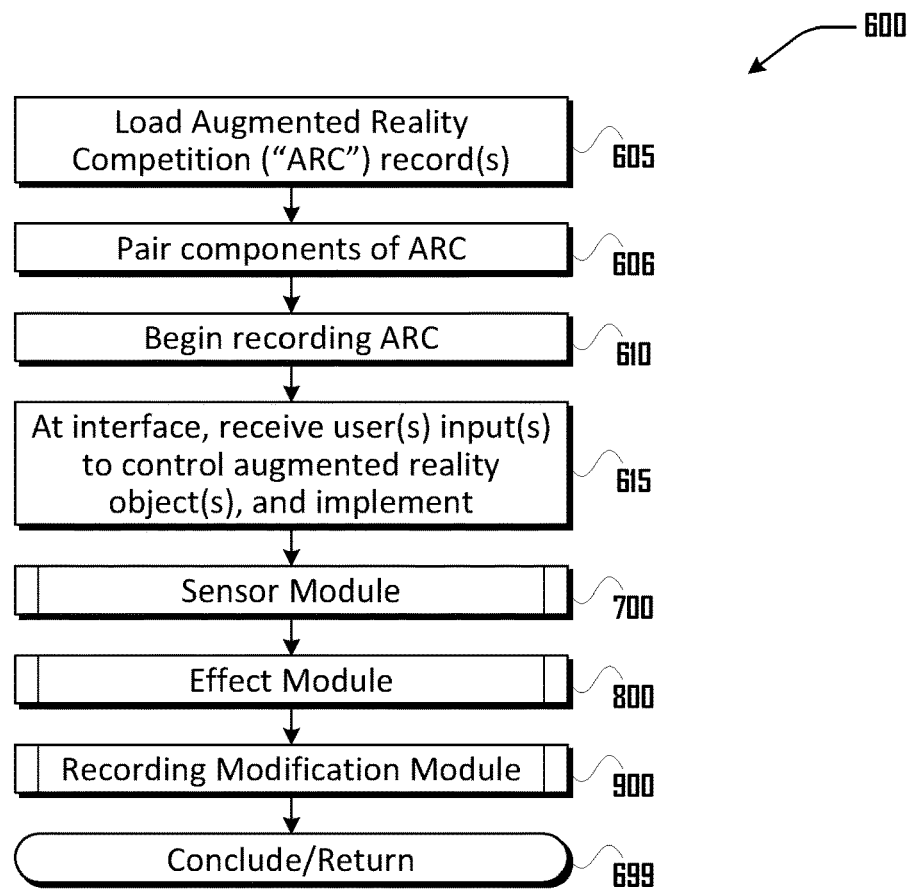
FIG. 6 is a flow diagram illustrating an example method for an Augmented Reality Competition module.

FIG. 6 is a flow diagram illustrating an example method for an Augmented Reality Competition Module 600 for selectively making and/or modifying a recording of Augmented Reality Competition 105. Augmented Reality Competition Module 600 may be executed by, for example, Augmented Reality Server 400. Augmented Reality Server 400 may execute code for an Augmented Reality Competition, as may be found in Augmented Reality Competition 505 record(s) in Augmented Reality Server Datastore 500.

As discussed in relation to FIG. 1, the Augmented Reality Competition may comprise Augmented Reality Objects, which may be defined in Augmented Reality Object 510 records in Augmented Reality Server Datastore 500.

The Augmented Reality Objects may be physical objects associated with Digital Objects, such as Digital Object 515 records in Augmented Reality Server Datastore 500. The association may be accomplished via an identifier in the Augmented Reality Object. The identifier may be a fixed component, such as a barcode or other information bearing symbol or may be included in, for example, a computer or computer memory in the Augmented Reality Object, such as in Computer 135 in ARO-1 110A.

Digital Object 515 records may comprise or be associated with Digital Object Trigger 520 records, which may describe input which triggers the corresponding Digital Object. Digital Object 515 records may further comprise or be associated with Digital Object Output 525 records, which may describe output of a triggered Digital Object 515. Such output may be to an Actuator, which may be recorded as an Actuator 540 record.

Sensors in the Augmented Reality Competition may be associated with Sensor 560 records. As discussed in relation to FIG. 1, Sensors may provide sensor data to Augmented Reality Server 400, which may be stored as Sensor Data 530.

Certain of Sensor Data 530 may be mapped to Digital Object 515 records by, for example, Sensor Data-to-Object Map 535 records (discussed further below).

At block 605, Augmented Reality Competition Module 600 loads Augmented Reality Competition 505 records, defining an Augmented Reality Competition.

At block 606, Augmented Reality Competition Module 600 may pair with and pair components of the Augmented Reality Competition. For example, Actuators, Recorders, Sensors, Augmented Reality Objects, Competitors and Controllers may all be paired with one another in the context of Augmented Reality Competition.

At block 610, Augmented Reality Competition Module 600 may begin to record the Augmented Reality Competition, such as via one or more Recorders (such as Recorders 115 in FIG. 1). The recordings may be stored in Augmented Reality Server Datastore as Recording 565 records.

At block 615, Augmented Reality Competition Module 600 may receive user or other input to control Augmented Reality Objects 510 in the Augmented Reality Competition 505. This may be accomplished via User Interface Module 460, which may receive user input from, for example, Controller 160 or the like.

At block 700, Augmented Reality Competition Module 600 may execute Sensor Module 700 as a subroutine. Sensor Module 700 may, for example, receive Sensor data, as may be found in Sensor Data 530 records, may process the Sensor data to identify Digital Objects and ARO, may determine if a Digital Object is a Notable Change, and may execute Effect Module 800 as a subroutine.

At block 800, Augmented Reality Competition Module 600 may execute Effect Module 800 as a subroutine to determine if Notable Change instances warrant selectively recording or selectively editing a recording of an Augmented Reality Competition.

At block 900, Augmented Reality Competition Module 600 may execute Recording Modification Module 900 as a subroutine to modify a recording of an Augmented Reality Competition according to Digital Object Output and, with respect to portions of a recording of an Augmented Reality Competition identified by Effect Module 800, to assemble and output the selectively edited video as a "highlights" video, which "highlights" video may be enjoyed without having to view all of the underlying video of the Augmented Reality Competition.

At block 699, Augmented Reality Competition Module 600 may conclude or return to a process which spawned it.

Figure 7:
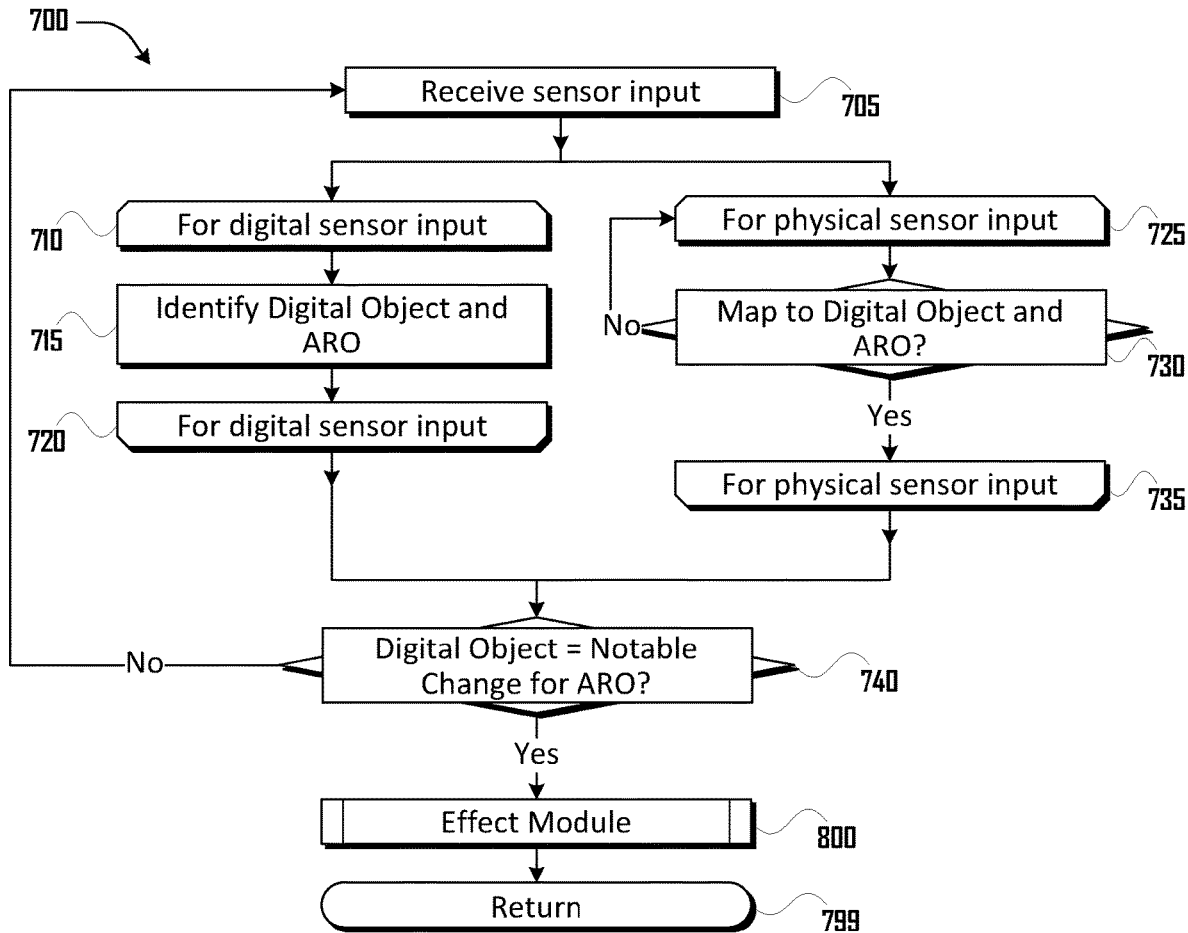
FIG. 7 is a flow diagram illustrating an example method for a Sensor module.

FIG. 7 is a flow diagram illustrating an example method for Sensor Module 700 processing Sensor Data to identify Digital Objects and ARO, to identify Notable Change instances, and to execute Effect Module 800 as a subroutine. Sensor Module 700 may be executed as a subroutine of Augmented Reality Competition Module 600, whether as a subroutine or independently.

At block 705, Sensor Module 700 may receive sensor input, which may be stored in Sensor Data 530 records. As noted elsewhere, sensor input may be received from Sensors, such as Sensor-1 125A and Sensor-2 125B, which sensor input may be from dedicated physical sensors or which sensor input may be from Digital Object Output 525 records. Sensor input may be received by registration of Sensor Module 700 with a module executing an Augmented Reality Competition, with an operating system, or the like, which module may provide information regarding Sensors. Sensor input may be received in relation to specific Augmented Reality Objects or may be received in relation to the Augmented Reality Competition, generally.

Opening loop block 710 to closing loop block 720 may be iterated with respect to sensor input from Digital Object Output 525 records.

At block 715, Sensor Module 700 may identify a Digital Object 515 records and Augmented Reality Object corresponding to the sensor input. For example, "shooting" a "bullet" at another car may be a Digital Object which produces a Digital Object Output corresponding to a "hit" or a "near miss" or the like on the target vehicle, which may be a Digital Object Trigger 520 for a Digital Object 515 representing the "hit" or "near miss" with respect to the targeted vehicle. In the case of block 715, the Digital Object 515 for both the shooting vehicle and the target vehicle are identified as Digital Objects 515 (as well as the corresponding Augmented Reality Objects).

Opening loop block 725 to closing loop block 735 may be iterated with respect to sensor input from physical sensors, which may not be from a Digital Object Output 525 record. At decision block 730, Sensor Module 700 may determine whether the sensor input maps to a Digital Object 515 record and an Augmented Reality Object 510 record. This mapping may be determined by, for example, Sensor Data-to-Object Map 535 record(s). For example, a speed value in a Sensor Data 530 record from a vehicle may map to a Digital Object 515 record associated with an Augmented Reality Object 510 record and to a Digital Object Output 525 record which instructs that the speed value is to be output to a window overlaid on a video, such as with respect to the user operating the Augmented Reality Object. Also by way of example, the same speed value may be processed as part of a window of speed values, which window may reveal a change in speed over time. If the change in speed over time is above a threshold, then the speed value may map to a different Digital Object 515 record associated with a different Digital Object Output 525 record, which may, for example, cause "smoke" to be rendered at the tires of an Augmented Reality Object which accelerated.

If affirmative at decision block 730, Sensor Module 700 may proceed to block 740 and may return to block 725 to iterate over the next sensor input; if negative, Sensor Module 700 may return to block 725 to iterate over the next sensor input.

At block 740, Sensor Module 700 may determine whether the Digital Object 515 of block 715 or 730 (if affirmative) is classified as or is associated with a Notable Change 545 record for an Augmented Reality Object; not all Digital Objects may be classified as a Notable Change 545. Returning to the example begun above, the Digital Object for "shooting" the "gun" at the other vehicle may not be associated with a Notable Change 545 record for the shooting vehicle; however, the Digital Object being a "hit" may be associated with a Notable Change 545 record. Association of Digital Object records with Notable Change 545 records may be set by a game designer or another such party, as well as parameters defining a magnitude of such an association.

At block 800, Sensor Module 700 (or Augmented Reality Competition Module 600) may execute Effect Module 800 as a subroutine, to determine if the Notable Change 545 is to be associated with a Record Instruction 555 record, which may cause associated video to be modified and/or output in a "highlights" video.

At block 799, Sensor Module 700 may conclude and/or may return to a process which spawned it.

Figure 8:
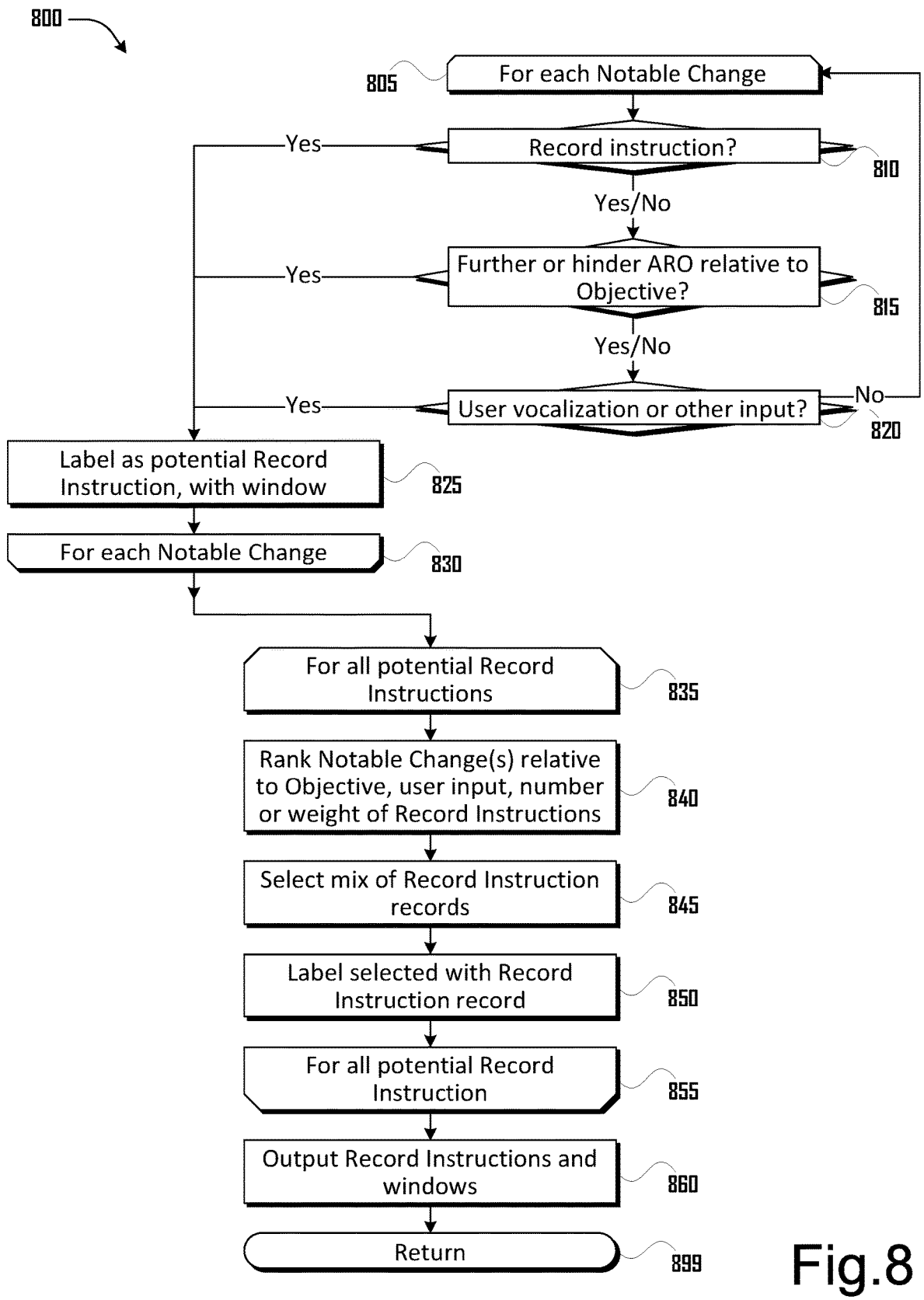
FIG. 8 is a flow diagram illustrating an example method for an Effect module.

FIG. 8 is a flow diagram illustrating an example method for Effect Module 800 to determine if Notable Change records are to be associated with a Record Instruction record, which may cause associated video to be modified and/or output in a "highlights" video. Effect Module 800 may be executed by, for example, Augmented Reality Server 400, whether as a subroutine of another module or independently.

Opening loop block 805 to closing loop block 835 may iterate for each Notable Change 545. At decision block 810, Effect Module 800 may determine whether the then-current Notable Change 545 record is associated with or comprises an instruction to output a corresponding portion or window of video, such as a portion of video for a time before/after Notable Change 545 occurred. If affirmative at block 810, Effect Module 800 may label the Notable Change 545 as being a potential Record Instruction 555 record.

If affirmative or negative at decision block 810, Effect Module 800 may proceed to decision block 815.

At decision block 815, Effect Module 800 may determine if the Notable Change 545 record furthers or hinders an ARO relative to an objective of the Augmented Reality Competition 505. For example, if an objective of the Augmented Reality Competition is to beat an opponent in a timed event, a change in speed may further or hinder one or another of multiple competitors and/or a speed change may be evaluated among (relative to) the competitors; action by competitor(s) to block passage of other(s) may further or hinder an objective; if an objective is to complete maneuvers for points, partial/complete/failure to perform an available maneuver may further or hinder an ARO. Evaluation of decision block 820 may involve accessing ARC Objective 550 record(s) and Notable Change 545 record(s), which may define the circumstances under which a Digital Object 515 record which is associated with a Notable Change 545 record is also furthering or hindering one or more ARO relative to an ARC Objective 550 record.

If affirmative or negative at decision block 815, Effect Module 800 may proceed to decision block 820.

At decision block 820, Effect Module 800 may determine if vocalization or other user input was received from one or more users in conjunction with the Notable Change 545 record. For example, users may vocalize or provide other forms of input at times of success or setback. The input vocalization may be processed with verbal command recognition modules or via speech-to-text modules for commands or key words or evaluation of input vocalization may be based on power level or number of parties, with or without regard to the "content" of the vocalization. Additional forms of input may be non-verbal, such as activation of an input key for this purpose, subjecting a controller to larger G-forces (such as by jerking it around) and the like. Such input may be understood to indicate interest by the parties in what occurred at that time in the Augmented Reality Competition. The input may be ranked based on the number of users providing such input in a cluster. In this way, users may learn that vocalizing, and vocalizing in larger groups, will result in a corresponding portion of the Augmented Reality Competition being included in a "highlights" video and may vocalize with this objective in mind.

At block 825, if affirmative at decision block 810, 815, or 820, Effect Module 800 may label the Digital Object 515 associated with a Notable Change 545 record as also potentially being associated with a Record Instruction 555 record. The number of such associations or the strength or weight of the Record Instruction 555 may be increased for each affirmative determination at decision blocks 810, 815, or 820. At this block, Effect Module 800 may also note a window of time around the Digital Object 515 which is to be recorded. This window may be based on when Digital Object Trigger 520 and Digital Object Output 525 record(s) occurred, a window of time which is set with respect to different Digital Objects, and the like.

Opening loop block 835 to closing loop block 860 may iterate for all potential Record Instructions of block 825.

At block 840, Effect Module 800 may rank Notable Change 545 records relative to ARC Objective 550 records, relative to the user input, and/or relative to the number or weight of potential Record Instructions determined at block 825.

For example, ten different change-in-speed instances may all have been identified as being associated with Notable Change 545 records. At block 845, Effect Module 800 may rank these according to, for example, the amount of change in speed or the relative difference in change in speed between users, or the like. Also by way of example, four of five users may have vocalized or provided other input (determined at block 820) with respect to one Notable Change 545 instance, whereas two of five users may have vocalized or provided input with respect to another Notable Change 545 instance. Also by way of example, one Notable Change 545 instance may have received affirmative responses at each of decision blocks 810, 815, and 820, whereas another may have received an affirmative response at only one or two of such decision blocks.

At block 845, Effect Module 800 may select a mix of Notable Change 545 records. The mix may be biased to include records which rank highly relative to the ARC Objective, which produced more user input, or may include consideration of additional factors, such as the number of each type of underlying Digital Object 515 records (to increase the diversity of representation of Digital Objects in the "highlights" video).

At block 850, Effect Module 800 may label records selected in block 845 with Record Instruction 555 records.

At block 860, Effect Module 800 may output the Record Instruction 555 records and recording windows. This output may be to Augmented Reality Competition Module 600, to Recording Modification Module 900, or to another module or process.

At block 899, Effect Module may conclude or may return to a process which spawned it.

Figure 9:
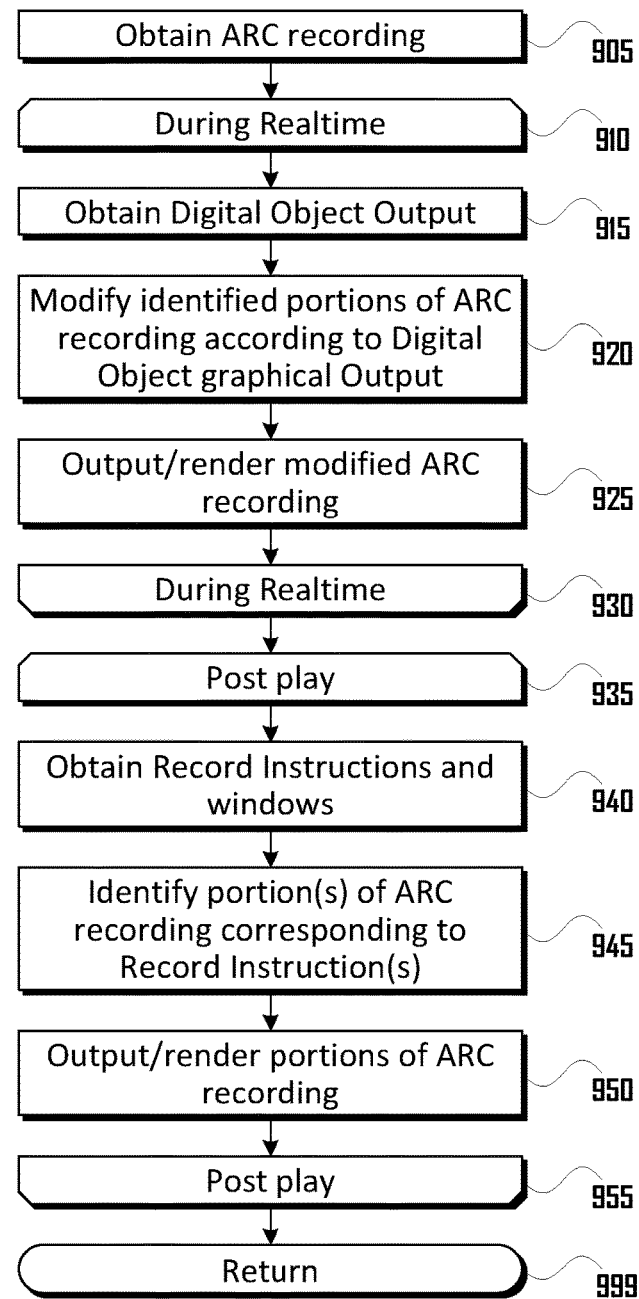
FIG. 9 is a flow diagram illustrating an example method for a Recording Modification module.

FIG. 9 is a flow diagram illustrating an example method for a Recording Modification Module 900. Recording Modification Module 900 may modify a recording of an Augmented Reality Competition according to Digital Object Output and, with respect to portions of a recording of an Augmented Reality Competition identified by Effect Module 800, to assemble and output the selectively edited video as a "highlights" video, which "highlights" video may be enjoyed without having to view all of the underlying video of the Augmented Reality Competition. Recording Modification Module 900 may be executed by Augmented Reality Competition Module 600 as a subroutine, independently, or as a subroutine of another process or module.

At block 905, Recording Modification Module 900 may obtain an Augmented Reality Competition recording, such as one begun at block 610, such as Recording 565.

Opening loop block 910 to closing loop block 930 may optionally execute during real-time play of the Augmented Reality Competition 505, such as when the players are wearing head-mounted displays or when the players or others are viewing screens which show the Augmented Reality Competition 515 in addition to the action and Augmented Reality Objects in the real physical environment. These blocks may alternatively execute after conclusion of play.

At block 915, such as in response to user or other input which was also a Digital Object Trigger 520, Recording Modification Module 900 may obtain Digital Object Output 525 associated with corresponding Digital Object 515 records. For example, a user's input button may "shoot" a "gun" at another user's ARO, which may be a Digital Object Trigger 520 for a Digital Object 515 for the "gun", associated with Digital Object Output 525 for "bullets".

At block 920, Recording Modification Module 900 may modify portions of the Augmented Reality Competition recording corresponding to the Digital Object Output 525. For example, the "bullets" may be added to a virtual 3-dimensional space representing the physical space occupied by the Augmented Reality Competition 505, which 3-dimensional space may be mapped to a view from a camera, such as a Recorder 115, with the "bullets" then added to the video recorded by the camera.

At block 925, the product of block 920 may be output, such as to a rendering device and/or may be saved.

Opening loop block 935 to closing loop block 950 may be performed after conclusion of the Augmented Reality Competition 505, or at least after processing by Sensor Module 700, Effect Module 800, and Recording Modification Module 900.

At block 940, Recording Modification Module 900 may obtain Record Instruction 555 records and corresponding windows, such as from Effect Module 800, block 860.

At block 945, Recording Modification Module 900 may identify corresponding portions of the modified Augmented Reality Competition recording, such as from block 925. If certain modifications were not implemented in real-time, blocks 905 to 930 may be iterated for such modifications.

At block 950, Recording Modification Module 900 may output and/or save the selected portions of the modified video as a "highlights" video, which "highlights" video may be enjoyed without having to view all of the underlying video of the Augmented Reality Competition.

At block 999, Recording Modification Module 900 may conclude or return to a process which spawned it.

Figure 10:
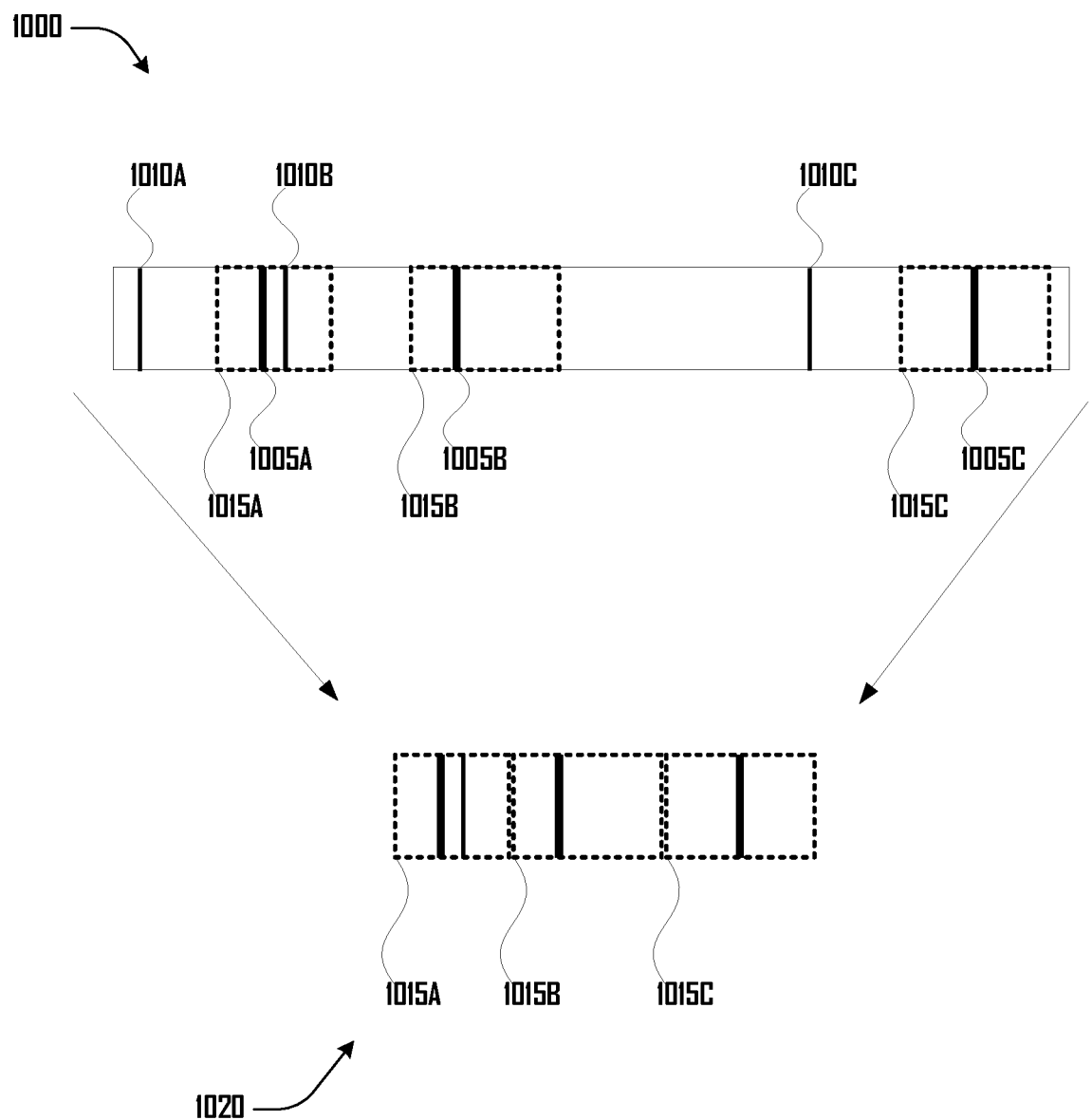
FIG. 10 is an illustration of a video of an augmented reality competition, changes which are identified within the competition, selected significant changes, and windows around each significant change which are output.

FIG. 10 illustrates Complete Video 1000 of an Augmented Reality Competition which may be recorded by, for example Augmented Reality Competition Module 600, and selectively reduced, in response to detection of notable changes in the Augmented Reality Competition.

Lines 1010A, 1005A, 1010B, 1005B, 1010C, and 1005C represent notable and not notable changes which occur within the Competition. Per Sensor Module 700, certain of these may be Digital Object 515 records which are sensed directly while certain of these may be Digital Object 515 records which are determined based on mapping physical Sensor Data 530 to Digital Object 515 records according to Sensor Data-to-Object Map 535.

Effect Module 800 may determine that the Digital Object 515 records represented by lines 1010A, 1010B, and 1010C are not notable, and do not warrant being preserved in a "highlights" video. Effect Module 800 may determine that the Digital Object 515 records represented by lines 1005A, 1005B, and 1005C are notable do warrant being preserved in a "highlights" video, within windows 1015A, 1015B, and 1015C.

Partial Video 1020 illustrates how windows 1015A, 1015B, and 1015C have been selected from Complete Video 1000 and merged to form one "highlights" video, labeled in FIG. 10 as Partial Video 1020.

Thus, via Sensor Module 700, certain Digital Object 515 records may be explicitly identified as also being associated with a Notable Change 545 record while certain physical sensor input may also be mapped to a Digital Object 515 record and to a Notable Change 545 record. Effect Module 800 determines if certain of the Notable Change 545 records are then explicitly associated with a Record Instruction 555 record, if Notable Change 545 records further or hinder an ARO with respect to an ARC Objective 550, and/or if user input is received in temporal proximity to a Digital Object 515. Effect Module 800 may further rank potential Record Instruction 555 records and may select a portion to be output in a "highlights" video, which selected portion is associated with a Record Instruction 555 record. Recording Modification Module 900 may then implement Digital Object Output 525 and may select the portions associated with a Record Instruction 555 to be output in a "highlights" video or recording.

These configurations are illustrative, other configurations may also be practiced.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for supporting an augmented reality competition, comprising: a computer processor and a memory, which memory comprises an augmented reality competition module, a sensor module, an effect module, and a recording modification module, which modules are to be operated by the computer processor; wherein the augmented reality competition module is to receive input from a participant in the augmented reality competition, which input is to at least partially control an augmented reality object; wherein the augmented reality competition module is to encode a video of the augmented reality object in the augmented reality competition; wherein the sensor module is to identify at least a first and a second change in the augmented reality object; wherein the effect module is to, between the first and second changes, determine an identified change to include in a highlights of the video; wherein the recording modification module is to select a portion of the video corresponding to the identified change as the highlights of the video and render or cause to be rendered the highlights of the video.

Example 2 may include the apparatus according to Example 1, wherein the sensor module, as part of identification of the first change with the sensor, is to further detect a first digital object and as part of identification of the second change with the sensor, the sensor module is to further detect a physical sensor data and determine that the physical sensor data maps to a second digital object.

Example 3 may include the apparatus according to any one of Example 1 and Example 2, wherein the effect module, as part of determination of the subset of the identified changes to include in the highlights of the video, is to determine for inclusion in the subset at least one of a change associated with a record instruction, a change which furthers or hinders the augmented reality object toward an objective in the augmented reality competition, and a change associated with user input, which user input is inferred to indicate interest.

Example 4 may include the apparatus according to Example 3, wherein the user input comprises vocalization by at least one user.

Example 5 may include the apparatus according to Example 3, wherein the effect module is further to rank the changes and select a portion of the ranked changes as the subset of the identified changes to include in the highlights of the video.

Example 6 may include the apparatus according to any one of Example 1 and Example 2, wherein the recording modification module, as part of render or cause to be rendered the selected portion of the highlights of the video, is to further modify the selected portion of the video to include a digital object output associated with the identified change.

Example 7 may include a method of selectively recording an augmented reality competition, comprising: in a computing device comprising a processor and a memory, a sensor, an augmented reality object, and a recorder, which computing device is associated with the augmented reality competition; with the recorder, encode a video of the augmented reality object in the augmented reality competition, which augmented reality object is at least partially controlled by a participant in the augmented reality competition; with the sensor, identifying at least a first and a second change in the augmented reality object; between the first and second changes, determining a subset of the identified changes to include in a highlights of the video; selecting a portion of the video corresponding to the determined subset of the identified changes as the highlights of the video; and rendering or causing to be rendered the highlights of the video.

Example 8 may include the method according to Example 7, wherein identifying the first change with the sensor further comprises detecting a first digital object and wherein identifying the second change with the sensor further comprises detecting a physical sensor data and determining that the physical sensor data maps to a second digital object.

Example 9 may include the method according to any one of Example 7 and Example 8, wherein determining the subset of the identified changes to include in the highlights of the video comprises determining for inclusion in the subset at least one of a change associated with a record instruction, a change which furthers or hinders the augmented reality object toward an objective in the augmented reality competition, and a change associated with user input, which user input is inferred to indicate interest.

Example 10 may include the method according to Example 9, wherein the user input comprises vocalization by at least one user.

Example 11 may include the method according to Example 9, further comprising, with the computing device, ranking the changes and selection a portion of the ranked changes to include in the subset of the identified changes to include in the video of highlights.

Example 12 may include the method according to any one of Example 7 and Example 8, wherein rendering or causing to be rendered the highlights of the video further comprises modifying the selected portion of the video to include a digital object output associated with the identified change.

Example 13 may include an apparatus for selectively recording an augmented reality competition, comprising: a computing device comprising a processor and a memory, a sensor, an augmented reality object, and a recorder, which computing device is associated with the augmented reality competition; means to, with the recorder, encode a video of the augmented reality object in the augmented reality competition, which augmented reality object is at least partially controlled by a participant in the augmented reality competition; means to, with the sensor, identify at least a first and a second change in the augmented reality object; means to, between the first and second changes, determine a subset of the identified changes to include in a highlights of the video;

means to select a portion of the video corresponding to the determined subset of the identified changes as the highlights of the video; and means to render or causing to be rendered the highlights of the video.

Example 14 may include the apparatus according to Example 13, wherein means to identify the first change with the sensor further comprises means to detect a first digital object and wherein means to identify the second change with the sensor further comprises means to detect a physical sensor data and means to determine that the physical sensor data maps to a second digital object.

Example 15 may include the apparatus according to any one of Example 13 and Example 14, wherein means to determine the subset of the identified changes to include in the highlights of the video comprises means to determine for inclusion in the subset at least one of a change associated with a record instruction, a change which furthers or hinders the augmented reality object toward an objective in the augmented reality competition, and a change associated with user input, which user input is inferred to indicate interest.

Example 16 may include the apparatus according to Example 15, wherein the user input comprises vocalization by at least one user.

Example 17 may include the apparatus according to Example 15, further comprising means to rank the changes and means to select a portion of the ranked changes to include in the subset of the identified changes to include in the highlights of the video.

Example 18 may include the apparatus according to any one of Example 13 and Example 14, wherein means to render or cause to be rendered the highlights of the video further comprises means to modify the selected portion of the video to include a digital object output associated with the identified change.

Example 19 may include one or more computer-readable media comprising instructions that cause a computing device, in response to execution of the instructions by one or more processors of the computing device, to: selectively record an augmented reality competition by: with an input interface of the computing device, receive input from a participant in the augmented reality competition, which input is to at least partially control an augmented reality object; with a recording device of the computing device, encode a video of the augmented reality object in the augmented reality competition; with a sensor of the computing device, identify at least a first and a second change in the augmented reality object; with an augmented reality competition module of the computing device, between the first and second changes, determine an identified change to include in a highlights of the video, select a portion of the video corresponding to the identified change as the highlights of the video, and render or cause to be rendered the highlights of the video.

Example 20 may include the computer-readable media according to Example 19, wherein to identify the first change with the sensor further comprises to detect a first digital object and wherein identify the second change with the sensor further comprises detect a physical sensor data and determine that the physical sensor data maps to a second digital object.

Example 21 may include the computer-readable media according to any one of Example 19 and Example 20, wherein to determine the subset of the identified changes to include in the highlights of the video comprises to determine for inclusion in the subset at least one of a change associated with a record instruction, a change which furthers or hinders the augmented reality object toward an objective in the augmented reality competition, and a change associated with user input, which user input is inferred to indicate interest.

Example 22 may include the computer-readable media according to Example 21, wherein the user input comprises vocalization by at least one user.

Example 23 may include the computer-readable media according to Example 21, wherein the augmented reality competition module is further caused to rank the changes and select a portion of the ranked changes as the subset of the identified changes to include in the highlights of the video.

Example 24 may include the computer-readable media according to any one of Example 19 and Example 20, wherein to render or cause to be rendered the highlights of the video further comprises to modify the selected portion of the video to include a digital object output associated with the identified change.

Other embodiments may use different sequencing, additional or fewer operations, and different nomenclature or terminology to accomplish similar functions. In some embodiments, various operations or set of operations may be performed in parallel with other operations, either in a synchronous or asynchronous manner. The operations selected here were chosen to illustrate some principals of operations in a simplified form. It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. An apparatus for supporting an augmented reality competition, comprising:
    a computer processor and a memory;
    an augmented reality competition module, a sensor module, an effect module, and a recording modification module, wherein the modules are coupled to the computer processor;
    wherein the augmented reality competition module is to receive input from a participant in the augmented reality competition, which input is to at least partially control an augmented reality object of the augmented reality competition, and wherein the augmented reality competition module is to encode a video of the augmented reality competition;
    wherein the sensor module is to identify at least a first and a second real time change in the augmented reality object during the augmented reality competition;
    wherein the effect module is to, between the first and second real time changes, determine a subset of the identified real time changes during the augmented reality competition to include in highlights of the video;
    wherein the recording modification module is to select a portion of the video corresponding to the subset of identified changes during the augmented reality competition as the highlights of the video and render or cause to be rendered the highlights of the video with the subset of identified changes determined during the augmented reality competition.

2. The apparatus according to claim 1, wherein the sensor module, as part of identification of the first real time change during the augmented reality competition with the sensor module, is to further detect a first digital object during the augmented reality competition and as part of identification of the second real time change during the augmented reality competition with the sensor module, the sensor module is to further detect physical sensor data and determine that the physical sensor data maps to a second digital object during the augmented reality competition.

3. The apparatus according to claim 1, wherein the effect module, as part of determination of the subset of the identified changes during the augmented reality competition to include in the highlights of the video, is to determine for inclusion in the subset at least one of the real time changes associated with a record instruction, a change which furthers or hinders the augmented reality object toward an objective in the augmented reality competition, or a change associated with user input, wherein the user input is inferred to indicate interest.

4. The apparatus according to claim 3, wherein the user input comprises vocalization by at least one user.

5. The apparatus according to claim 3, wherein the effect module is further to rank the changes and select a portion of the ranked changes as the subset of the identified changes to include in the highlights of the video.

6. The apparatus according to any one of claim 1, wherein the recording modification module, as part of render or cause to be rendered the selected portion of the highlights of the video, is to further modify the selected portion of the video to include a digital object output associated with the identified change.

7. A computer implemented method of selectively recording an augmented reality competition, comprising:
encoding a video of an augmented reality competition with a recorder, wherein the augmented reality competition comprises an augmented reality object at least partially controlled by a participant in the augmented reality competition;
identifying at least a first and a second real time change in the augmented reality object during the augmented reality competition based on sensor data;
between the first and second real time changes, determining a subset of the identified real time changes during the augmented reality competition to include in highlights of the video;
selecting a portion of the video corresponding to the determined subset of the identified changes as the highlights of the video; and
rendering or causing to be rendered the highlights of the video with the determined subset of the identified changes during the augmented reality competition.

8. The method according to claim 7, wherein identifying the first change with the sensor data further comprises detecting a first digital object during the augmented reality competition and wherein identifying the second real time change with the sensor further comprises detecting physical sensor data and determining that the physical sensor data maps to a second digital object during the augmented reality competition.

9. The method according to claim 7, wherein determining the subset of the identified changes during the augmented reality competition to include in the highlights of the video comprises determining for inclusion in the subset at least one of a real time change associated with a record instruction, a change which furthers or hinders the augmented reality object toward an objective in the augmented reality competition, or a change associated with user input, wherein the user input is inferred to indicate interest.

10. The method according to claim 9, wherein the user input comprises vocalization by at least one user.

11. The method according to claim 9, further comprising, with a computing device, ranking the changes and selecting a portion of the ranked changes to include in the subset of the identified changes to include in the video of highlights.

12. The method according to claim 7, wherein rendering or causing to be rendered the highlights of the video further comprises modifying the selected portion of the video to include a digital object output associated with the identified change.

13. One or more non-transitory computer-readable media comprising instructions that cause a computing device, in response to execution of the instructions by one or more processors of the computing device, to:
selectively record an augmented reality competition by:
with an input interface of the computing device, receive input from a participant in the augmented reality competition, wherein the input is to at least partially control an augmented reality object during the augmented reality competition;
with a recording device of the computing device, encode a video of the augmented reality competition, wherein the augmented reality competition comprises the augmented reality object;
with a sensor of the computing device, identify at least a first and a second real time change in the augmented reality object during the augmented reality competition;
with an augmented reality competition module of the computing device, between the first and second real time changes, determine a subset of identified real time changes during the augmented reality competition to include in highlights of the video, select a portion of the video corresponding to the subset of identified real time changes as the highlights of the video, and render or cause to be rendered the highlights of the video with the subset of identified real time changes during the augmented reality competition.

14. The computer-readable media according to claim 13, wherein to identify the first real time change with the sensor further comprises to detect a first digital object during the augmented reality competition and wherein to identify the second real time change with the sensor further comprises detect physical sensor data and determine that the physical sensor data maps to a second digital object during the augmented reality competition.

15. The computer-readable media according to claim 13, wherein to determine the subset of the identified real time changes during the augmented reality competition to include in the highlights of the video comprises to determine for inclusion in the subset at least one of a real time change associated with a record instruction, a change which furthers or hinders the augmented reality object toward an objective in the augmented reality competition, or a change associated with user input, wherein the user input is inferred to indicate interest.

16. The computer-readable media according to claim 15, wherein the user input comprises vocalization by at least one user.

17. The computer-readable media according to claim 15, wherein the augmented reality competition module is further caused to rank the changes and select a portion of the ranked changes as the subset of the identified changes to include in the highlights of the video.

18. The computer-readable media according to claim 13, wherein to render or cause to be rendered the highlights of the video further comprises to modify the selected portion of the video to include a digital object output associated with the identified change.

* * * * *